United States Patent Office 3,195,672
Patented July 20, 1965

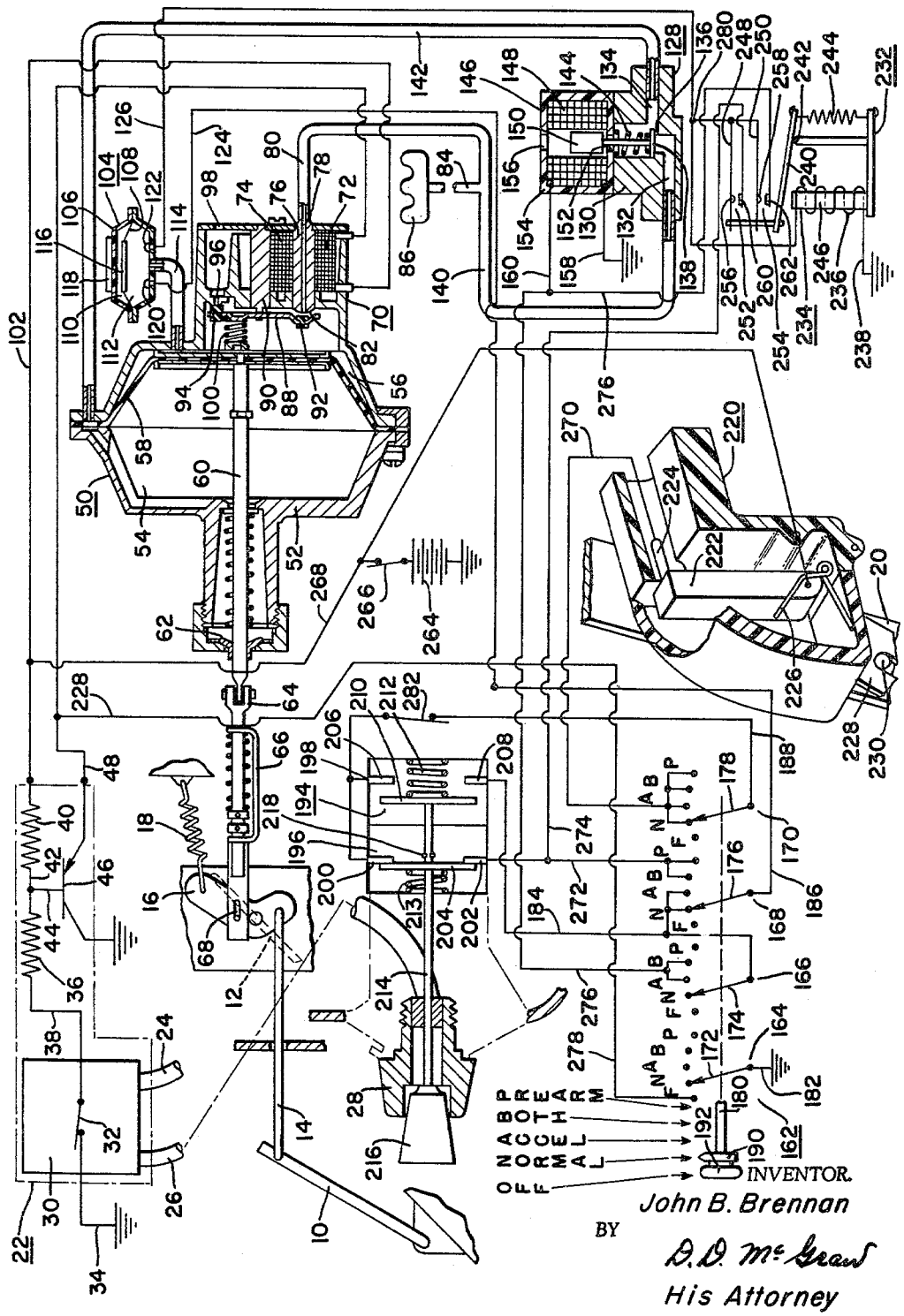

3,195,672
MULTIPLE OPERATION MODE ROAD VEHICLE CONTROL SYSTEM
John B. Brennan, Flint, Mich., assignor to General Motors Corporation, Detroit, Mich., a corporation of Delaware
Filed Apr. 29, 1963, Ser. No. 276,318
15 Claims. (Cl. 180—82.1)

The invention relates to a control system for a road vehicle and more particularly to one in which several different modes of operation are selectively available. A system embodying the invention can be set by the vehicle operator so that the entire system is inoperable in one condition, a second condition in which the system will warn the vehicle operator of the attainment of a desired vehicle speed and may upon further selection by the vehicle operator control the road speed of the vehicle so as to maintain it at the desired set speed; a third condition in which the system is so energized as to permit the operator to accelerate the vehicle to the set speed under power throttle control and to maintain the set speed only so long as the operator positively maintains the acceleration control in position; a fourth condition in which the system is prearmed so that when the vehicle is manually accelerated to the set speed the system automatically takes over control of the vehicle speed and maintains the set speed; and a fifth condition combining the features of the third and fourth conditions.

The system embodying the invention is somewhat similar to the systems disclosed and claimed in copending applications Serial No. 211,763, filed July 23, 1962, and entitled "Vehicle Speed Warning and Cruise Control System," now Patent No. 3,109,507 and Serial No. 276,317, filed April 29, 1963, and entitled "Vehicle Road Speed Warning and Speed Control System." The system also utilizes the speed transducer disclosed in copending applications Serial No. 67,820, filed November 7, 1960, and entitled "Vehicle Speed Warning and Cruise Control System," now Patent No. 3,088,538 and Serial No. 137,423, filed September 11, 1961, and entitled "Vehicle Speed Warning and Cruise Control System," now Patent No. 3,087,340. Reference is therefore made to these applications for details of construction and operation of the speed transducer and the disclosures therein relative to the speed transducers are incorporated herein by reference.

A system embodying the invention herein disclosed and claimed is designed to give a complete range of operational choices to the vehicle operator, depending upon the condition of operation of his vehicle and his personal desires. The system includes a condition selection switch assembly, a speed transducer into which is set a desired speed which is compared to the actual vehicle speed and, within a constant range of vehicle speed, senses speed error and generates a speed error signal. This signal is translated into a fluid pressure signal which acts on a servo attached to the vehicle engine throttle valve linkage to either give a speed warning condition of operation or a speed maintaining condition of operation or to accelerate the vehicle to the set speed, depending upon the selected condition and the mode of operation within that condition chosen by the vehicle operator. The system includes a brake release switch which deenergizes the system when the vehicle brakes are applied. It also includes a mode switching valve arrangement for selectively admitting a fluid pressure into the throttle valve controlling servo to oppose the proportional control fluid pressure for speed maintenance or to accelerate the vehicle to the set speed, depending upon the selected condition of operation. The system includes mechanism for inhibiting the accomplishment of a speed maintaining condition of operation until the vehicle is manually accelerated into the speed error sensing range. The controls for the fluid pressure portion of the system are preferably electrical to permit ease of assembly within a vehicle.

In the drawing:

The figure is a schematic diagram of the system embodying the invention as installed on a vehicle having an engine controlled by the throttle valve. Mechanical portions of the systems are illustrated in section as necessary, with parts being broken away, and with other portions of the system being illustrated as block diagram sections.

The vehicle in which the system shown in the drawing is installed includes an accelerator pedal 10 connected to move an engine throttle valve 12 through a rod 14 and an arm 16 in the usual manner. A throttle valve return spring 18 is provided to urge the throttle valve 12 to the zero throttle position. The vehicle is also equipped with a brake pedal arm 20 which is pivoted in the usual manner when the operator desires to actuate the vehicle brakes.

A speed transducer assembly 22, which may be of the type disclosed in the above noted applications, receives vehicle speed information through the speedometer cable 24. A desired vehicle speed is set into the speed transducer 22 through the cable 26 which is actuated by the speed set knob 28 under control of the vehicle operator. The speed transducer 22 includes the speed error sensing mechanism 30 which is schematically illustrated as having a switch 32 therein. This switch is normally closed until the actual vehicle speed enters a constant range of vehicle speed containing the desired set speed, at which time the contacts of the switch 32 are cyclically opened and closed with the amount of open time in each cycle depending upon the speed error so that the resulting signal reflects the amount of speed error and indicates whether the speed error is above or below the set speed. Details of operation of speed transducers of this type are found in the above noted applications. The speed transducer 22 has one contact of switch 32 grounded at 34 and the other contact connected to a resistor 36 through electrical lead 38. A second resistor 40 is connected in series with resistor 36 by electrical lead 42 and an electrical lead 44 connects electrical lead 42 to the base of the transistor 46. The collector side of the transistor 46 is connected to ground and the emitter side is connected to electrical lead 48. Resistors 36 and 40 provide a voltage divider and the arrangement is such that when current is flowing through the switch 32 the transistor 46 is on and when switch 32 is opened the transistor is off.

The system also includes the servo assembly 50. The servo housing 52 is divided into a speed control chamber 54 and a speed warning chamber 56 by the power diaphragm 58. Push rod 60 is connected to the diaphragm 58 and extends through seal 62 in the housing. Push rod 60 is connected through joint 64 and the lost motion mechanism 66 to the throttle linkage arm 16 by a pin and slot connection 68. Movement of diaphragm 58 to the left can urge the throttle valve 12 toward the open throttle valve position and movement of the diaphragm to the right can urge the throttle valve to the closed throttle valve position.

A proportional control mechanism 70 is provided in the portion of servo housing 52 adjacent chamber 56. Mechanism 70 includes an electromagnet 72 having a coil 74 and a core 76. A passage 78 extends through core 76 and is connected to a fluid pressure conduit 80 at one end and terminates in a valve seat 82 within chamber 56. Conduit 80 is connected with a conduit 84 in communication with a suitable source of fluid pressure such as the engine intake manifold 86. A valve assembly 88 is pivotally mounted on support 90 in chamber 56 so that the valve 92 of the assembly 88 is in position to seat and unseat relative to the valve seat 82 as the valve assembly is pivoted on support 90. Another valve 94 mounted on the other side of the pivot from valve 92 is positioned to open and close an atmospheric air inlet orifice 96 connected with the atmosphere through inlet 98. Spring 100 urges the valve assembly to a pivoted position wherein valve 94 closes orifice 96 and valve 92 opens passage 78 to chamber 56. Electromagnet 72 has one end connected through electrical lead 102 to resistor 40 of the speed transducer assembly 22. The other end of coil 74 is connected with electrical lead 48 which is connected with the emitter side of transistor 46.

An inhibiting and prearming switch 104 includes a non-magnetic and electrically insulating housing 106 having a diaphragm 108 dividing the housing into an atmospheric chamber 110 and a pressure chamber 112. Conduit 114 connects chamber 112 with the speed warning chamber 56 of the servo. A bar 116 of magnetic material is secured to diaphragm 108 and is attracted upwardly to the position shown in the drawing by a magnet 118 mounted on housing 106. Spaced contacts 120 and 122 are mounted in housing 106 so that they are in position to be contacted by bar 116 and cooperate therewith to form an electrical switch which is closed when subatmospheric pressure is imposed in chamber 112 of sufficient pressure differential to move the diaphragm 108 downwardly against the magnetic force of magnet 118 acting on bar 116. Electrical lead 124 is electrically connected to contact 120 and electrical lead 126 is electrically connected to contact 122.

A mode control valve assembly 128 includes a housing 130 provided with an inlet passage 132 and an outlet passage 134 connected through valve seat 136 and controlled by valve 138. Passage 132 is connected through conduit 140 to the intake manifold conduit 84 and passage 134 is connected through conduit 142 to the speed control chamber 54 of the servo 50. Valve 138 is normally held seated against seat 136 by spring 144. An electromagnet 146 is mounted on housing 130 and includes a coil 148 and a movable core 150 which is connected to valve 138 through the aperture 152. The electromagnet housing 154 is provided with air inlet aperture 156 so that atmospheric air is present in passage 134 by way of aperture 152 when valve 138 is seated on valve seat 136. One end of core 150 also acts as a valve to close air inlet 156 when the electromagnet 146 is electrically energized to move core 150 upwardly, thus sealing passage 134 from atmospheric pressure under this condition. When valve 138 is unseated in this manner, passages 132 and 134 are interconnected. Coil 148 has one end connected to ground through electrical lead 158 and the other end connected to electrical lead 160.

A mode selector switch assembly 162 is provided with four switch subassemblies 164, 166, 168 and 170. Each switch subassembly includes a contact arm, 172, 174, 176 and 178, respectively, and five contacts which are identified in each switch assembly as contacts F, N, A, B and P, in order. Arms 172, 174, 176 and 178 are connected by an actuating rod 180 so that they move in unison and each arm contacts the same named contact in its own switch subassembly at the same time. The assembly 162 may easily be constructed as a rotary type switch assembly rather than as the linear movement type schematically illustrated. Arm 172 is grounded through lead 182. Arm 174 is connected to electrical lead 184. Arm 176 is connected to electrical lead 186. Arm 178 is connected to electrical lead 188. In the position shown in the drawing each of the arms is in contact with contact N of its switch subassembly. The position of the arms in relation to the contacts of each switch subassembly correspond to the five mode selector positions indicated by the pointer 190 on rod 180. These conditions are "Off," "Normal," "Accelerate," "Both" and "Prearm." A knob 192 is secured to rod 180 so that the rod may be moved to any one of the five positions.

An operational control switch assembly 194 includes switches 196 and 198. Switch 196 is comprised of contacts 200 and 202 which are normally bridged by bar 204. Switch 198 includes contacts 206 and 208 which may be bridged by bar 210. Spring 212 keeps switch 198 normally open and spring 213 keeps switch 196 normally closed. Bars 204 and 210 are mounted on a push-pull rod 214 which extends through the speed set knob 28 and is provided with a knob 216 by which the operator can control the switch. An abutment 218 on rod 214 is provided to engage bar 204 so that upon pulling knob 216 to the left, the operator can open switch 196. In the position shown, spring 212 is almost at its free length so that abutment 218 is normally spaced from bar 204 and the bar 204 is normally engaged with its contacts.

A brake switch assembly 220 is mounted on the vehicle so that its contact 222 engages its contact 224 when the brake pedal arm 20 is in the brake release position. Spring 226 normally holds contact 222 against contact 224. A switch operating arm 228 is secured to contact 222 and is operated by the brake pedal arm pin 230 to open the switch 220 when the brake is applied.

A holding relay assembly 232 includes an electromagnet 234 which has one end of its coil 236 connected to ground through electrical lead 238 and the other end connected to electrical lead 126. A relay armature 240 is pivoted at 242 and biased by spring 244 away from the core 246 of electromagnet 234. Armature 240 acts as an actuating lever to which contact mounting springs 248 and 250 are attached in electrically insulated relation. Normally open switches 252 and 254 have contacts 256 and 258 respectively secured to springs 248 and 250 and cooperating contacts 260 and 262 which are respectively engageable by contacts 256 and 258 when electromagnet 234 is energized to pivot armature 240.

The system is energized by means of a suitable source of electrical energy schematically illustrated as battery 264. The battery is connected through ignition switch 266 to electrical lead 268. This lead is electrically connected to contact 222 of the brake switch 220 and to lead 102 intermediate resistor 40 and the electromagnet 72. Contact 224 of the brake switch 220 is connected through electrical lead 270 to contacts N, A, B and P of switch 170.

Contact 202 of operational control switch assembly 194 is connected through electrical lead 272 to contacts B and P of switch 168. Electrical lead 274 is connected to lead 272 and to contact 260 of the holding relay assembly 232. Contact 208 of operational control switch assembly 194 is connected to electrical lead 184 leading to arm 174 of switch 166 and is also connected through branches of this lead to contacts N and A of switch 168. Contacts 200 and 206 are connected in parallel to electrical lead 188 which contains a transmission operated switch 282. This switch is closed only when the transmission is in the drive position, and may be omitted if it is not desired to render the systems inoperable in all other transmission control conditions. Electrical lead 276 is connected to contacts A and B of switch 166, to lead 160 from electromagnet 146 of the mode control valve assembly 128, and to contact 262 of the holding relay assembly 232. Contact F of switch 164 is connected through electrical lead 278 to electrical lead 48 intermediate transistor 46 and electromagnet 72. Electrical lead 186 from switch arm 176 is connected to electrical lead 124 of the inhibiting and prearming switch assembly 104. Contacts 256 and 258 of holding relay assembly 232 are electrically connected at 280 to lead 126 intermediate electromagnet 234 and switch assembly 104. Switch 164 therefore has open contacts N, A, B and P; switch 166 has open contacts F, N and P; switch 168 has open contact F; and switch 170 has open contact F.

The system may be conditioned for several different types of operation including one condition wherein the entire system is inoperative. The inoperative condition is obtained by setting indicator 190 of mode selector assembly 162 at the "Off" position. The contact arms of each of the switches of assembly 162 are then in contact with their associated contacts F. Thus switches 166, 168 and 170 are open and electrical lead 278 is grounded through switch 164. This grounds both the emitter and collector sides of transistor 46 so that coil 74 of electromagnet 72 is always energized even though the vehicle may enter the speed error sensing range. Thus valve 92 is held seated on seat 82 while valve 94 is open, and atmospheric air pressure is in speed warning chamber 56. Since electromagnet 146 is deenergized, valve 136 of the mode control valve assembly 128 is seated and atmospheric air is present in the speed control chamber 54 of the servo 50 through conduit 142 and assembly 128. The operator therefore controls the engine throttle valve 12 manually by movement of the accelerator pedal 10 and diaphragm 58 of the servo 50 merely follows movements of the throttle linkage.

When the operator positions indicator 190 in the "Normal" position, the contact arms of the switches of selector assembly 162 engage their associated contacts N. Thus switch 164 is open and transistor 46 is no longer grounded through lead 278. Switch 166 is also open, while switches 168 and 170 complete circuits insofar as the switches themselves are concerned. Electrical energy from the source 264 goes through lead 268, brake relay switch 220, lead 270, switch 170, lead 188 and switch 282, to contacts 200 and 206 of operational control switch assembly 194. Since switch 196 is closed, lead 272 is also energized as is lead 274 to contact 260 of the relay assembly 232. When the vehicle is below the speed error sensing range the speed transducer switch 32 is closed so that the transistor 46 completes the circuit containing lead 48 and coil 74 of electromagnet 72 is therefore energized. Thus, as before, atmospheric pressure is in speed warning chamber 56 of the servo 50. Since electromagnet 146 is not energized, atmospheric pressure is also present in speed control chamber 54 of the servo. Due to the magnetic attraction of magnet 118, the switch 104 is open. Since the electromagnet 234 of relay assembly 232 is also deenergized, switches 252 and 254 of that assembly are open.

When the vehicle reaches the lower limit of the speed error sensing range switch 32 cyclically opens as described above. Coil 74 is then deenergized while switch 32 is open, and vacuum from manifold 86 is proportioned into chamber 56 by valve 92 in accordance with the speed transducer generated speed error signal. When the vehicle has reached the set speed, which may for example be 60 m.p.h. with the speed error sensing range extending from 57 m.p.h. to 63 m.p.h., sufficient proportioned pressure at less than atmospheric pressure is imposed in chamber 56 to cause diaphragm 58 to move to the right and exert a throttle closing force on arm 16 of the throttle linkage. This force is felt by the vehicle operator through the pedal 10 as a back pressure. The force becomes stronger as the speed of the vehicle continues to increase until the vehicle passes beyond the speed error sensing range, at which time the force is constant in relation to engine vacuum. When the proportional pressure in chamber 56 is sufficient to act on diaphragm 108 of switch assembly 104 to move bar 116 away from magnet 118, switch 104 is closed by engaging bar 116 with contacts 120 and 122. This may occur at or slightly below the set speed. This does not energize electromagnet 146 at this time since switch 198 of the operational control switch assembly 194 is open. However, the closing of switch assembly 104 upon substantial attainment of the set speed removes the inhibition of the system from being engaged in a speed maintaining condition of operation. After switch 104 is closed the operator may engage the system in the speed maintaining condition of operation by pushing knob 216 inwardly to close switch 198. This energizes electromagnet 234 through lead 184, switch 168, leads 186 and 124, switch 104 and lead 126. Thus the relay assembly 232 is actuated to close switches 252 and 254 and lead 276 is thereby energized through switch 254. Electromagnet 146 is then energized through lead 160 to open valve 138 and admit manifold vacuum to speed control chamber 54. The opposing engine intake manifold pressure and proportional control pressure act on diaphragm 58 to maintain the vehicle at the set speed. Since switch 252 is closed, electromagnet 234 remains energized through switch 196, lead 272, lead 274, switch 252 and connection 280 to lead 126. The operator may then release knob 216 and spring 212 will open switch 198. However, the holding relay assembly 232 will hold electromagnet 146 energized and the system will remain in the speed maintaining condition of operation until released. The system may be released by actuating the vehicle brakes to open switch 220, thus interrupting the supply of electrical energy to electromagnet 146 cutting off the supply of vacuum to servo speed control chamber 54 and replacing it with atmospheric pressure. The same effect may also be obtained by pulling out knob 216 to open switch 196, or moving knob 192 to reposition selector assembly 162 in the "Off" position.

The acceleration condition of operation is obtained by positioning the mode selector assembly 162 so that the switch arms of the assembly are in contact with contacts A. In this condition of operation the electromagnet 72 is constantly energized so long as the vehicle is below the speed error sensing range since switch 32 is closed. Switch 166 is in a position such that the circuit to electromagnet 146 can be completed by the operator by the closing of switch 198, thus bypassing the inhibiting switch 104. The pressure in speed warning chamber 56 is atmospheric pressure since valve 92 is seated to close passage 78. When the operator presses knob 216 inwardly to close switch 198, and holds it in this position, electromagnet 146 is energized. This occurs even though the vehicle may be stopped or at any speed below the speed error sensing range of the speed transducer 22. Valve 138 is opened by electromagnet 146 and engine intake manifold vacuum is introduced into chamber 54. Diaphragm 58 thus moves to the left to open the engine throttle valve 12, causing the vehicle to accelerate. Since switch 104 is open, the holding relay assembly 232 is not energized and the only holding action for maintaining energization of electromagnet 146 is the manual holding action of the operator keeping switch 198 closed against the force of spring 212. As the vehicle continues to accelerate it reaches the speed error sensing range and the proportional control action of the valve assembly 88 will cause proportional control pressure to be admitted to speed warning chamber 56. This pressure acts on diaphragm 58 in opposition to intake manifold vacuum in chamber 54 and causes the diaphragm 58 to move to the right to the necessary extent for maintaining the set vehicle speed. It also acts on diaphragm 108 to close switch 104, thus energizing the holding relay assembly 232 to hold electromagnet 146 energized upon the manual release of knob 216 resulting in the opening of switch 198. Relay assembly 232 remains energized through switch 196 and the system then functions in the speed maintaining condition of operation until released by opening the brake release switch 220, the manual release switch 196, or moving the mode selector to the "Off" position. Thus this mode of system operation permits the vehicle operator to accelerate from any speed to the desired set speed and to establish the speed maintaining condition of operation upon attainment of the set speed. When the switch 198 is not closed to obtain acceleration, the system operates in the same manner as in the "Normal" condition. A speed warning back pressure will be obtained when the vehicle reaches the desired set speed and the operator may lock the system in the speed maintaining condition by pushing knob 216 inwardly to close switch 198 momentarily while the vehicle is operating in or above the speed error sensing range.

The "Prearm" condition of operation differs from the other conditions of operation in that when the vehicle is brought up to the preset speed by normal operation of the accelerator pedal, the system is automatically placed in the speed maintaining condition of operation. This is accomplished by connecting contact 120 of switch 104 to the source of electrical energy through normally closed switch 196 of the operational control switch assembly 194 rather than through the normally open switch 198 of that assembly. When the vehicle reaches the set speed, engine intake manifold vacuum in the servo speed warning chamber 56 acts to close switch 104 and energize the relay assembly 232, putting the system in the speed maintaining mode of operation. The operator is not required to push knob 216 and the system will automatically shift to the speed maintaining condition of operation so long as the vehicle is in or above the speed error sensing range. In order to release the system, the vehicle brakes must be applied to open brake switch 220 and to bring the vehicle to a speed below the speed error sensing range, or knob 216 must be pulled to open switch 196 and hold it open until the vehicle speed drops below the speed error sensing range, or mode selector assembly 162 must be set to the "Off" position.

The "Both" mode of operation combines the features of the "Acceleration" and "Prearm" condition of operation. This permits the operator to accelerate under power throttle conditions from any speed up to the set speed and the system will automatically change to the speed maintaining mode of operation. If the operator does not use the power acceleration feature but manually accelerates to the preset speed, the system will shift to the speed maintaining condition of operation as in the prearm condition rather than merely giving a speed warning back pressure as occurs in the "Normal" and "Acceleration" conditions of operation.

In the claims:
1. A vehicle road speed warning and control system for a vehicle having a vehicle engine speed control mechanism, said system comprising,
   first means for generating a speed error signal,
   second means for moving said vehicle engine speed control mechanism under power,
   third means for manually moving said vehicle engine speed control mechanism,
   a source of power for said second means,
   fourth means receiving said signal and power from said source for delivering power to said second means in response to said signal for urging said vehicle engine speed control mechanism toward a decreasing speed direction,
   fifth means receiving power from said source and selectively operable to deliver power to said second means for urging the vehicle engine speed control mechanism toward an increasing speed direction,
   first normally open switch means connected to close in in response to power at said second means from said fourth means,
   second normally open switch means for electrically bypassing said first switch means,
   holding means for closing and holding said second switch means closed when energized,
   mode selector switch means for selectively conditioning selective ones of said means to provide any of a plurality of selective system conditions, said plurality of selective system conditions comprising at least an "off" condition and a system operational condition,
   operator controlled switch means for activating the system in at least one of the plurality of system conditions,
   and a source of electrical energy having one side connected to said first and fourth means and to said mode selector switch means.

2. The system of claim 1, said mode selector switch means being positioned to render said first means inoperative to generate a speed error signal and to render said fifth means inoperative to deliver power to said second means to condition said system to a mode wherein only said third means is capable of moving said vehicle engine speed control mechanism.

3. The system of claim 1, said mode selector switch means being positioned to condition said system to provide a speed warning at a desired vehicle speed by connecting said source of electrical energy to energize said first means and said fourth means.

4. The system of claim 1, said mode selector switch means being positioned to condition said system to provide a speed warning at a desired vehicle speed
   by connecting said source of electrical energy to energize said first means to furnish said speed error signal to said fourth means when the actual vehicle speed approaches the desired vehicle speed within a limited constant range of vehicle speed.

5. The system of claim 4, said first means being constructed and arranged to generate the speed error signal only when the actual vehicle speed is within the limited constant range of vehicle speed including the desired vehicle speed
   to activate said fourth means for the delivery of sufficient power to said second means to provide the speed warning as a speed decreasing force delivered to said third means.

6. The system of claim 4, said mode selector switch means being positioned to condition said system to provide a speed warning at a desired vehicle speed
   and to condition said operator control switch means for changing the speed warning condition of said system to a vehicle speed maintaining condition by connecting said source of electrical energy to energize said first means and said fourth means.

7. The system of claim 1, being operable to provide a speed warning at a desired vehicle speed,
   said mode selector switch means being positioned to connect said source of electrical energy to energize said first and fourth means,
   said first means commencing to generate the speed error signal when the actual vehicle speed enters a range of vehicle speed including the desired vehicle speed to activate said fourth means for deliver of sufficient power to said second means to provide the speed warning as a speed decreasing force to said third means.

8. The system of claim 7, being further operable to maintain the actual vehicle speed at the desired vehicle speed independently of operator operation of said third means,
   said first switch means being closed by power delivered to said second means by said fourth means,
   said operator controlled switch means being connected through said mode selector switch means to said source of electrical energy and operable to energize said fifth means through said first switch means to provide power to said second means for cooperation with power from said fourth means to maintain the actual vehicle speed at the desired set speed.

9. The system of claim 8, wherein said holding means is connected to be energized concurrently with said fifth means
   to close said second switch means
   to electrically bypass said first switch means and the fifth means energizing action of said operator controlled switch means
   to maintain said fifth means energized,
   and means for manually disconnecting said fifth means from said source of electrical energy to return said system to a speed warning condition.

10. The system of claim 1, said mode selector switch means being positioned to condition said system to provide a power acceleration condition subject to control of said operator control switch means
   by connecting said source of electrical energy to energize said first means and said fourth means and to prearm said fifth means,
said operator control switch means being connected to energize said fifth means independently of operation of said first switch means.

11. The system of claim 1, said operator controlled switch means including a normally closed switch and a normally open switch,
   said mode selector switch means connecting said source of electrical energy to said normally closed switch and to one contact of said normally open switch of said operator controlled switch means and connecting said fifth means to the other contact of said normally open switch means,
   said normally open switch being manually closeable to energize said fifth means to actuate said second means to power accelerate the vehicle.

12. The system of claim 11, said first means generating the speed error signal at a predetermined vehicle speed
   to cause said fourth means to deliver power to said second means as aforesaid to oppose power delivered to said second means from said fifth means
   to prevent power acceleration of the vehicle at vehicle speeds greater than the predetermined vehicle speed.

13. The system of claim 12, said mode selector switch means further connecting said holding means to said source of electrical energy through said first switch means
   to permit said holding means to close said second switch means and connect said fifth means and said holding means to said source of electrical energy independently of further opening and closing of said first switch means and said operator controlled switch means normally open switch upon delivery of power to said second means by said fourth means
   to keep said fifth means operable
   to cause said second means to move said vehicle engine speed control mechanism to maintain the vehicle speed substantially constant relative to the predetermined vehicle speed.

14. The system of claim 1, said mode selector switch means connecting said holding means to said source of electrical energy through and subject to closing of said first switch means and connecting said fifth means to said source of electrical energy subject to closing of said second switch means by said holding means
   to cause said fourth and fifth means to deliver power to second means to maintaining a constant vehicle speed in accordance with said speed error signal when said first switch means is closed.

15. A vehicle speed warning and control system comprising:
   means generating a speed error signal within a constant range of vehicle speed including a desired vehicle speed;
   vehicle engine speed control mechanism;
   servo means for moving said vehicle engine speed control mechanism under power;
   manually operable means and manually moving said vehicle engine speed control mechanism;
   a source of servo power;
   and control means for said servo receiving servo power from said source and said speed error signal,
   and selectively operable to permit power acceleration of the vehicle by said servo means from a vehicle speed below the constant range of vehicle speed to the desired vehicle speed,
   manual acceleration of the vehicle by said manually operable means,
   speed warning of a condition wherein the actual vehicle speed equals the desired vehicle speed,
   and maintenance of the vehicle speed at the desired vehicle speed.

References Cited by the Examiner
UNITED STATES PATENTS

| | | | |
|---|---|---|---|
| 2,916,100 | 12/59 | Teetor | 180—82.1 |
| 3,081,837 | 3/63 | Fiteny | 180—82.1 |
| 3,087,340 | 4/63 | McMurray et al. | 180—82.1 X |
| 3,088,538 | 5/63 | Brennan et al. | 180—82.1 |

A. HARRY LEVY, *Primary Examiner.*